United States Patent [19]

Robello et al.

[11] Patent Number: 5,008,043
[45] Date of Patent: Apr. 16, 1991

[54] OPTICAL ARTICLE EXHIBITING A HIGH LEVEL OF SECOND ORDER POLARIZATION SUSCEPTIBILITY

[75] Inventors: Douglas R. Robello, Webster; Abraham Ulman, Brighton; Edward J. Urankar, Rochester; Craig S. Willand, Pittsford, all of N.Y.

[73] Assignee: Eastman Kodak Company, Rochester, N.Y.

[21] Appl. No.: 494,376

[22] Filed: Mar. 16, 1990

[51] Int. Cl.$^5$ .................. F21V 9/00; G02B 6/00; G02B 6/10
[52] U.S. Cl. .................. 252/582; 350/96.34; 350/96.12; 350/96.29; 350/96.14
[58] Field of Search .............. 252/582, 585, 586, 589; 260/607 A, 2 R; 350/96.34

[56] References Cited

U.S. PATENT DOCUMENTS

| | | | |
|---|---|---|---|
| 3,758,593 | 9/1973 | Koshar | 260/607 A |
| 3,776,960 | 12/1973 | Koshar et al. | 260/607 A |
| 3,794,687 | 2/1974 | Koshar et al. | 260/607 A |
| 3,932,526 | 1/1976 | Koshar | 260/607 A |
| 3,933,914 | 1/1976 | Coles et al. | 260/577 |
| 3,984,357 | 10/1976 | Koshar | 250/2 R |
| 4,018,810 | 4/1977 | Skoog | 260/465 D |
| 4,792,208 | 12/1988 | Ulman et al. | 350/96.34 |
| 4,796,971 | 1/1989 | Robello et al. | 350/96.34 |
| 4,886,339 | 12/1989 | Scozzafava | 350/96.34 |

FOREIGN PATENT DOCUMENTS 0058839 4/1986 European Pat. Off. .

OTHER PUBLICATIONS

D. J. Williams, "Organic Polymeric and Non-Polymeric Materials with Large Optical Nonlinearities", Angew. Chem. Int. Ed. Engl. 23, 1984, 690.
Zyss, "Nonlinear Organic Materials for Integrated Optics", Journal of Molecular Electronics, 1, 1985, 25.
R. J. Koshar and R. A. Mitsch, "Bis(Perfluoroalkylsulfonyl)Methanes and Related Disulfones", J. Org. Chem., 1973, 38, 3358.
P. I. Ogoiko, V. P. Nazretyan, A. Ya.ll'chenko, and L. M. Yaguol'skii, "Perfluoroalkylsulfonylacetic and Perfluoroalkylsulfonylmalonic Esters", J. Org. Chem., USSR, 1980, 16, 1200.
L. M. Yagupol'skii and L. Z. Gandel'sman, "Effect of the Trifluoromethylsulphonyl Group on the Colour of Dimethylaminoazo Dyes", Dyes and Pigments, 1982, 3, 1.
P. D. Ries and C. J. Eckhardt, "Observation of the H Band in the Crystal Spectrum of 4-{4,4-Bis-((Trifluoromethyl)Sulfonyl)-1,3-Butadienyl} N,N-Dimethylbenzeneamine (FSMB)", Chem. Phys. Lett., 1988, 153, 223.

*Primary Examiner*—John S. Maples
*Assistant Examiner*—Shean C. Wu
*Attorney, Agent, or Firm*—Carl O. Thomas

[57] ABSTRACT

An optical article is disclosed containing, for the transmission of electromagnetic radiation, a medium exhibiting a second order polarization susceptibility greater than $10^{-9}$ electrostatic units comprised of polar aligned noncentrosymmetric molecular dipoles. The molecular dipoles have a hydrophobic electron donor moiety linked through a conjugated $\pi$ bonding system to an electron acceptor sulfonyl moiety. The electron acceptor sulfonyl moiety includes at least two halogen substitutents of its $\alpha$ carbon atom.

20 Claims, 2 Drawing Sheets

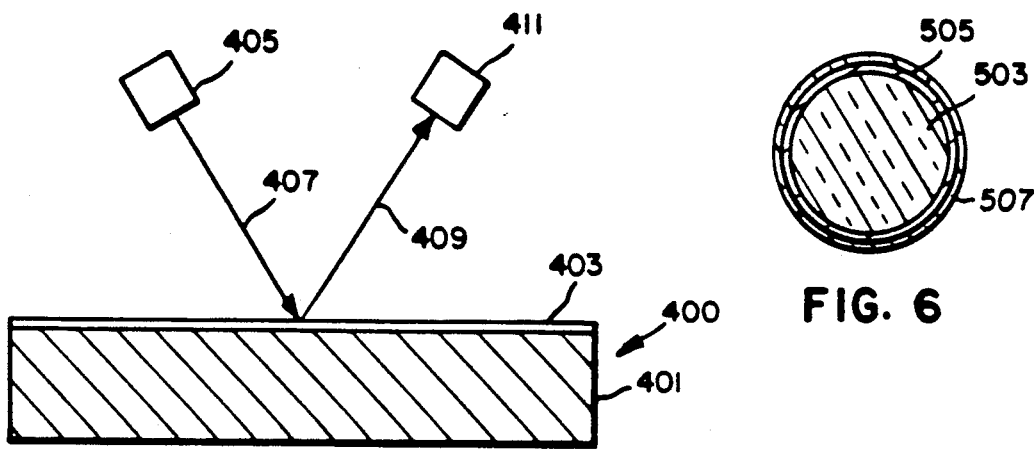
FIG. 4
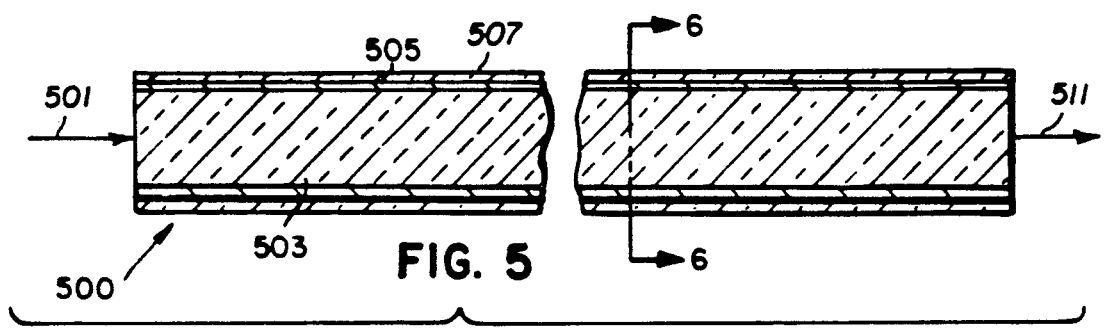
FIG. 5
FIG. 6
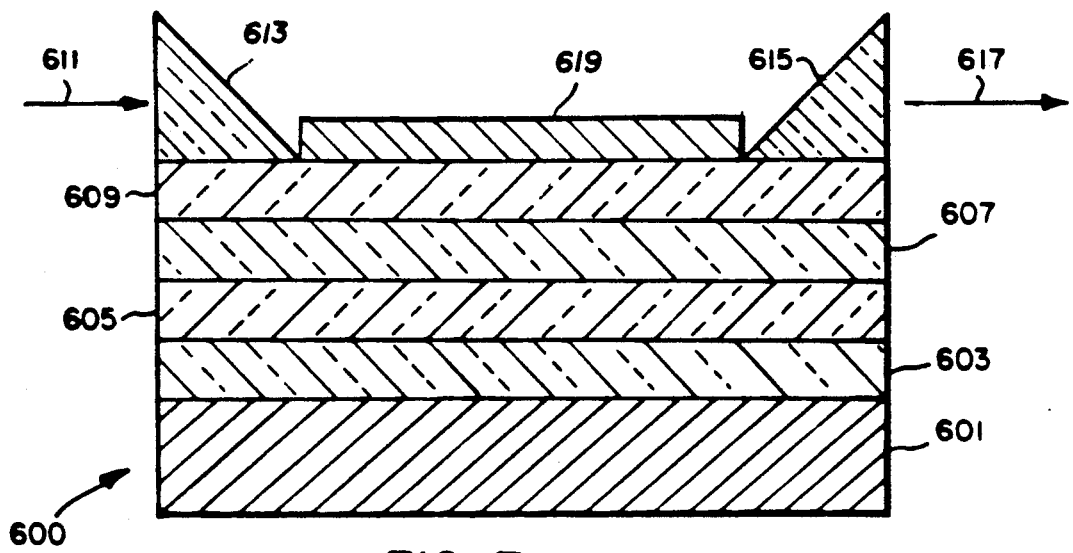
FIG. 7

OPTICAL ARTICLE EXHIBITING A HIGH LEVEL OF SECOND ORDER POLARIZATION SUSCEPTIBILITY

FIELD OF THE INVENTION

The invention relates to optical articles, particularly articles which exhibit effects attributable to the polarization of electromagnetic radiation. The invention relates specifically to optical articles which exhibit effects attributable to the nonlinear polarization of electromagnetic radiation.

BACKGROUND OF THE INVENTION

The significant polarization components of a medium produced by contact with an electric field are first order polarization (linear polarization), second order polarization (first nonlinear polarization), and third order polarization (second nonlinear polarization). On a molecular level this can be expressed by Equation 1:

$$P = \alpha E + \beta E^2 + \gamma E^3 \ldots \quad (1)$$

where
P is the total induced polarization,
E is the local electric field created by electromagnetic radiation, and
$\alpha$, $\beta$, and $\gamma$ are the first, second, and third order polarizabilities, each of which is a function of molecular properties.

$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)}E + \chi^{(2)}E^2 + \chi^{(3)}E^3 \ldots \quad (2)$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic wave transmission medium.

$\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi^{(1)}E$, second order or first nonlinear polarization $\chi^{(2)}E^2$, and third order or second nonlinear polarization $\chi^3 E^3$.

To achieve on a macromolecular level second order polarization ($\chi^{(2)}E^2$) of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu.

A significant difficulty encountered in finding suitable molecular dipoles for second order polarization effects lies in the molecular requirements that must be satisfied to achieve usefully large values of $\beta$. For a molecule to exhibit values of $\beta$ greater than zero, it is necessary that the molecule be asymmetrical about its center—that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment—e.g., the alignment obtained when molecular dipoles are placed in an electric field.

Second order polarization ($\chi^{(2)}E^2$) has been suggested to be useful for a variety of purposes, including optical rectification (converting electromagnetic radiation input into a DC output), generating an electro-optical (Pockels) effect (using combined electromagnetic radiation and DC inputs to alter during their application the refractive index of the medium), phase alteration of electromagnetic radiation, and parametric effects, most notably frequency doubling, also referred to as second harmonic generation (SHG).

For a number of years the materials employed for achieving second order polarization effects were noncentrosymmetric inorganic crystals, such as potassium dihydrogen phosphate and lithium niobate. Interest in nonlinear optical properties has increased in recent years, driven primarily by the emergence of optical telecommunications, but also stimulated by a broader need to raise optical manipulation capabilities closer to parity with those employed in electronics. This has resulted in an unsatisfied need for higher performance materials.

D. J. Williams, "Organic Polymeric and Non-Polymeric Materials with Large Optical Nonlinearities", Angew. Chem. Int. Ed. Engl. 23, 1984, 690, reports second order polarization susceptibilities, $\chi^{(2)}$, achieved with a variety of organic molecular dipoles. The molecular dipoles reported are comprised of an electron acceptor moiety bonded to an electron donor moiety by a linking moiety providing a conjugated $\pi$ bonding system for electron transfer. Specific electron donor moieties disclosed are dimethylamino, 2- or 4-pyridyl, 2-quinolinyl, and 2-benzothiazolyl. Specific conjugated $\pi$ bonding systems reported are phenylene and combinations of ethylene (vinylene) and phenylene moieties. Specific electron acceptor moieties disclosed are oxo, cyano, and nitro.

Zyss, "Nonlinear Organic Materials for Integrated Optics", Journal of Molecular Electronics, 1, 1985, 25, discloses a variety of molecular dipole structures for nonlinear optics.

Ulman et al U.S. Pat. No. 4,792,208 demonstrates organic molecular dipoles having high ($>10^{-30}$ esu) second order hyperpolarizabilities ($\beta$) and capable of being polar aligned to produced films exhibiting high ($>10^{-9}$ esu) second order polarization susceptiblities ($\chi^{(2)}$). The substitution of sulfonyl as an electron acceptor moiety for the oxo, cyano, and nitro electron acceptor moieties previously known to the art offers a variety of advantages. None of the oxo, cyano, or nitro moieties can be chemically substituted without destroying their essential electronic properties. On the other hand, the sulfonyl moiety of Ulman et al requires by definition a hydrocarbon substituent, which can be further substituted with functional groups, if desired. Thus, the sulfonyl electron acceptor moiety offers much greater synthetic freedom for controlling the physical properties of the molecular dipole for optimum utilization. The substitution of sulfonyl dipoles for oxo, cyano, and nitro dipoles can extend optical utility to different wavelength regions of the spectrum by being more transparent to input electromagnetic radiation, output radiation—e.g., second harmonic radiation, or a combination of both. The sulfonyl dipoles offer a broader range of solvent and binder compatibilities for achieving the required polar alignments for useful effects produced by second order polarization in optical articles. Sulfonyl substitution to achieve optimized physical compatibility with other materials encountered in optical article fabrication is readily achieved. For the fabrication of Langmuir-Blodgett (LB) films the sulfonyl group can be chosen to exhibit either a hydrophilic or hydrophobic characteristic. Additionally, the sulfonyl group can be chosen to act as a linking group to a polymer backbone, if desired. By employing a sulfonyl electron acceptor group in combination with a hydrocarbon substituted electron donor group it is apparent that both ends of the dipolar molecule can be optimized for the construction of polar aligned molecular dipoles.

Compounds in which a sulfonyl group is halo-substituted are generally known in the art. Illustrative compounds are illustrated by the following:

C-1 R. J. Koshar and R. A. Mitsch, "Bis(perfluoroalkylsulfonyl)methanes and Related Disulfones, J. Org. Chem., 1973, 38, 3358;

C-2 Koshar U.S. Pat. No. 3,758,593;

C-3 Koshar et al U.S. Pat. No. 3,776,960;

C-4 Koshar et al U.S. Pat. No. 3,794,687;

C-5 Koshar U.S. Pat. No. 3,932,526;

C-6 Coles et al U.S. Pat. No. 3,933,914;

C-7 Koshar U.S. Pat. No. 3,984,357;

C-8 Koshar et al U.S. Pat. No. 4,053,519;

C-9 Skoog U.S. Pat. No. 4,018,810;

C-10 P. I. Ogoiko, V. P. Nazretyan, A.Ya. Il'chenko, and L. M. Yaguol'skii, "Perfluoroalkylsulfonylacetic and Perfluoroalkylsulfonylmalonic Esters", J. Org. Chem. USSR, 1980, 16, 1200;

C-11 L. M. Yagupol'skii and L. Z. Gandel'sman, "Effect of the Trifluoromethylsulphonyl Group on the Colour of Dimethylaminoazo Dyes," Dyes and Pigments, 1982, 3, 1;

C-12 Leichter et al European Patent Application No. 0,058,839, published Apr. 16, 1986; and C-13 P. D. Ries and C. J. Eckhardt, "Observation of the H Band in the Crystal Spectrum of 4-{4,4-Bis[(trifluoromethyl)sulfonyl]-1,3-butadienyl}-N,N-dimethylbenzeneamine (FSMB)", Chem. Phys. Lett., 1988, 153, 223.

None of the compounds of C-1 to C-13 were mentioned by their authors to have utility in high second order polarization susceptibility optically active layers. Still more revealing, none or these compounds nor any compound having a sulfonyl electron acceptor moiety was discussed by Williams or Zyss, cited above, in their general discussions of organic molecular dipoles and optically active layers.

SUMMARY OF THE INVENTION

In one aspect this invention is directed to an optical article containing, for the transmission of electromagnetic radiation, a medium exhibiting a second order polarization susceptibility greater than $10^{-9}$ electrostatic units comprised of polar aligned noncentrosymmetric molecular dipoles having an electron donor moiety linked through a conjugated $\pi$ bonding system to a sulfonyl electron acceptor moiety to permit oscillation of the molecular dipole between a lower polarity ground state and a higher polarity excited state. The molecular dipoles are characterized in that the sulfonyl electron acceptor moiety includes at least two halogen substituents of its $\alpha$ carbon atom.

The presence of two or three halogen substituents to the $\alpha$ carbon atom of the sulfonyl electron acceptor moiety of polar aligned organic molecular dipoles in optically active layers has been observed to produce large increases in the second order polarization susceptibilities of these layers as compared to layers containing similar organic molecular dipoles, but without the required halogen substitution of the sulfonyl $\alpha$ carbon atom. Further, all of the advantages observed by Ulman et al to flow from the presence of a sulfonyl electron acceptor moiety in an organic molecular dipole are retained. Thus, the present invention constitutes a significant improvement over the prior state of the art.

BRIEF DESCRIPTION OF THE DRAWINGS

FIG. 4 is an alternative form of a second harmonic generating optical article.

FIG. 5 is an optical article for achieving parametric effects.

FIG. 6 is a section taken along section line 6—6 in FIG. 5.

FIG. 7 is an optical article for achieving parametric effects and phase shifting.

DESCRIPTION OF PREFERRED EMBODIMENTS

Figure 1:
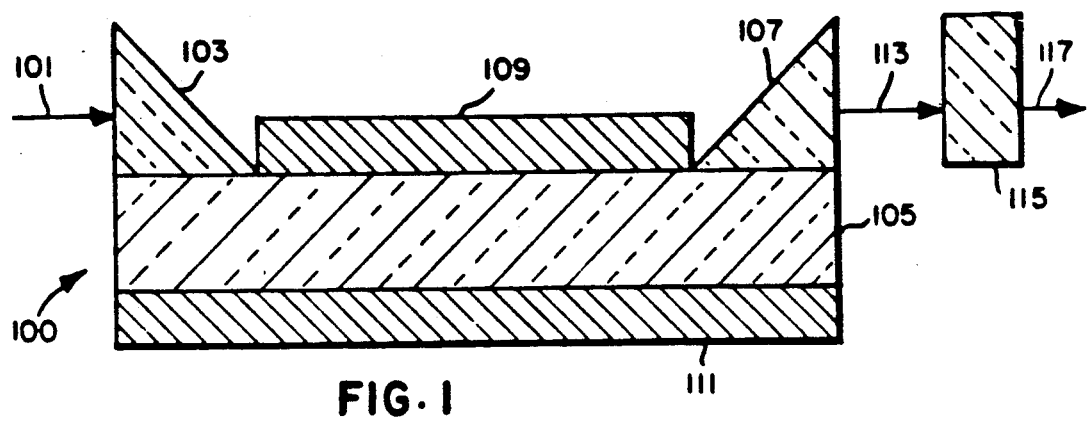
FIG. 1 is a second harmonic generating optical article.

The following are illustrative of optical articles satisfying the invention exhibiting effects attributable to second order polarization:

Referring to FIG. 1, the optical article 100 is capable of generating a second harmonic of electromagnetic radiation 101 supplied to it. Incoming electromagnetic radiation is introduced through input means 103, shown as a first prism, into an optically active transmission medium 105 which exhibits a high level ($>10^{-9}$ esu) second order or first nonlinear polarization susceptibility, hereinafter referred to simply as the optically active transmission medium according to the invention or, more succinctly, as the optically active transmission medium. Electromagnetic radiation is transmitted through the medium 105 to output means 107, shown as a second prism. In the simplest form of the optical article neither the input nor output prisms are required. Escape of electromagnetic radiation from the transmission medium can be minimized by locating optional cladding elements 109 and 111 above and below the transmission medium. The cladding elements can serve one or a combination of different functions. First, they provide physical protection for the optically active transmission medium. Second they can be used to control the wavefront distribution of transmitted radiation. When two cladding layers of the same refractive index are shown, a symmetrical wavefront distribution results. When the two cladding layers differ in their refractive indices or one of the two cladding layers, usually the upper cladding layer, an assymetrical wavefront distribution exists. A third important function provided by cladding layers is to prevent direct contact of the optically active transmission medium with metallic layers, such as electrodes, and thereby reduce attenuation of electromagnetic radiation as it is being guided longitudinally through the device.

When the transmission medium is constructed according to the requirements of the invention, specifically described below, at least a portion of the electromagnetic radiation entering the transmission medium will be alterred in frequency during its travel through the medium. More specifically, a second harmonic of the frequency will be generated. The electromagnetic radiation leaving the output means, indicated by arrow 113, exhibits both the original frequency of the input radiation and a second harmonic of this frequency. Although shown by a single arrow, the different radiation frequencies will exit from the prims 107 at divergent angles, and this divergence in exit paths can be relied upon for separation of the electromagnetic radiation into its separate wavelength components. Alternatively, the electromagnetic radiation retaining the original frequency can, if desired, be removed by passing the electromagnetic radiation leaving the article through a filter 115 capable of absorbing radiation of the original frequency while transmitting higher frequency (shorter wavelength) portions of the electromagnetic radiation. By employing one or a combination of filters any broad or narrow frequency band of electromagnetic radiation can be retained in the transmitted output electromagnetic radiation 117.

Figure 2:
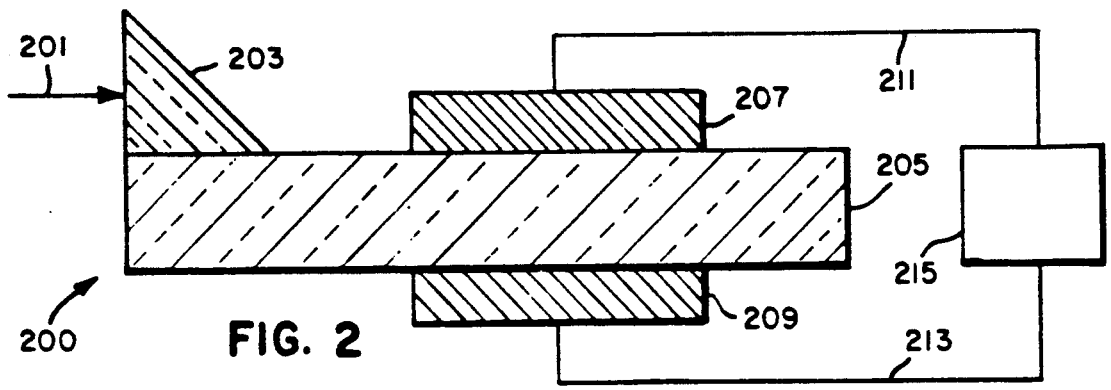
FIG. 2 is a DC signal providing optical article.

Referring to FIG. 2, an optical article 200 is shown capable of producing a DC potential when electromagnetic radiation 201 is supplied through input means 203, shown as a prism, to optically active transmission medium 205, which can be identical to medium 105, described above. When electromagnetic radiation is being transmitted through the medium a potential difference is produced between upper electrode 207 and lower electrode 209 in electrical contact with the upper and lower surfaces of the transmission medium. Electrical conductors 211 and 213 can be used to relay the potential of the upper and lower electrodes to an electronic response unit 215. The electronic response unit can in its simplest form be a unit that provides a digital response indicative of the presence or absence of electromagnetic radiation in the transmission medium. Alternatively, the electronic response unit can provide an analog response indicative not only of the presence, but also the intensity of electromagnetic radiation in the transmission medium.

By modifying the optical article 200 to interpose cladding layers similar to those described above between the electrodes 207 and 209 and the optically active transmission medium an optical article is created that can be employed as a phase shifter. In this case an electrical potential is supplied from a source 215 through conductors 211 and 213 to electrodes 207 and 209, respectively. Electromagnetic radiation 201 from a beam splitter (not shown) is then fed to the device through the input means 203. The effect of the applied potential gradient on the electromagnetic radiation being guided through the optically active transmission medium is to cause light emerging from the optically active medium to be phase shifted as compared to a second portion of the electromagnetic radiation supplied from the beam splitter and guided through a transparent optically passive medium.

Figure 3:
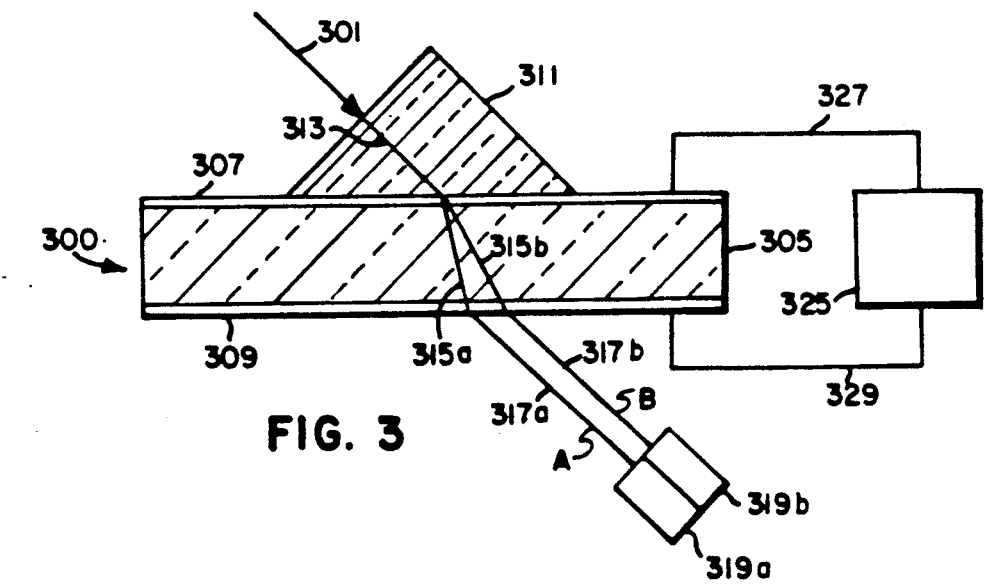
FIG. 3 is an electromagnetic beam displacement optical article.

Referring to FIG. 3, the optical article 300 is capable of physically displacing a beam 301 of electromagnetic radiation being transmitted through it as a function of the concurrent receipt of a DC bias. Optically active transmission medium 305, which can be identical to optically active medium 105 or 205, is provided with transparent upper and lower electrodes 307 and 309. The electrodes can, for example, be thin layers of a vacuum vapor deposited metal or metal oxide—e.g., indium tin oxide. An electromagnetic radiation input means, shown as prism 311, is located on the upper transparent electrode. The electromagnetic radiation passes through the prism as indicated by arrow 313. When the electromagnetic radiation enters the transmission medium, it follows either path 315$a$ or path 315$b$. Depending upon which of the two alternative paths are followed, the first electromagnetic radiation either travels along path 317$a$ or 317$b$ upon emerging from the lower transparent electrode. The paths 315$a$ and 317$a$ together constitute an A path through the optical article while the paths 315$b$ and 317$b$ together constitute a B path through the optical article. Sensing units 319$a$ and 319$b$ are located to receive electromagnetic radiation traveling along the A and B paths, respectively. It is apparent that only one of the two sensing units is essential, since failure to sense electromagnetic radiation can be employed to indicate that the electromagnetic radiation has shifted to the alternate path.

Shifting of electromagnetic radiation between the A and B paths is achieved by supplying a DC bias to the upper and lower electrodes while transmission of the electromagnetic radiation through the optically active transmission medium is occurring. To accomplish the required DC bias a DC potential source 325 is shown connected to the upper and lower electrodes by electrical conductors 327 and 329.

Application of the DC bias alters the refractive index of the transmission medium when it is formed of a material exhibiting a significant second order susceptibility. This causes the first electromagnetic radiation beam to be refracted at a different angle when the transmission medium is electrically biased, and this changes the first electromagnetic radiation path through the transmission medium. In some instances the refractive index of the transmission medium is increased by the electrical bias and in other instances lowered by the electrical bias, depending upon whether the molecular dipole contained within the transmission medium exhibits a positive or negative first hyperpolarizability $\beta$.

In FIG. 4 an optical article 400 is shown comprised of a reflective substrate 401 and an optically active transmission medium 403 according to the invention shown in the form of a layer. Electromagnetic radiation is supplied from a source 405 as indicated by arrow 407. The electromagnetic radiation traverses the optically active transmission medium, is reflected by the substrate, and traverses the optically active transmission medium a second time. Electromagnetic radiation leaving the optically active transmission medium is indicated by arrow 409. A sensor 411 which is responsive to the second harmonic of the input electromagnetic radiation, but not radiation at the wavelength of the input radiation, is shown provided to receive electromagnetic radiation from the layer 403. Instead of employing a sensor that is selectively responsive to the second harmonic wavelength, separation of the fundamental and second harmonic wavelengths can be undertaken as described above in connection with FIG. 1. The thinner the layer of the optically active transmission medium, the higher the intensity of the input electromagnetic radiation must be in order to achieve a given output of second harmonic radiation. In the limiting case the optically active transmission medium can be a monomolecular oriented molecular dipole layer.

In FIGS. 5 and 6 an optical article 500 according to the invention is shown capable of inducing parametric effects, such as second harmonic generation, by acting on input electromagnetic radiation, indicated by arrow 501. To achieve alteration of the input radiation a transparent optical waveguide 503 of any conventional type is provided having on its external surface a layer of an optically active transmission medium 505 according to the invention, which can have the same properties as the medium 105, described above. The optical waveguide 503 is normally optically passive—that is, exhibits no significant levels of nonlinear (second or third order) polarization. Concentrically surrounding the optically active transmission medium 505 is a cladding layer 507. The waveguide 503 and the cladding layer 507 each have a lower refractive index than the optically active transmission medium 505.

As the input electromagnetic radiation 501 traverses the waveguide 503, a portion of the radiation will impinge on the surrounding layer of the optically active transmission medium 505 and be refracted back into the waveguide. Successive impingements of transmitted radiation on the optically active medium result in measurable parametric effects, such as second harmonic generation. The cladding layer 507 performs the function of the cladding layers described in FIG. 1.

In FIG. 7 an optical article 600 is shown capable of producing useful parametric effects similarly as optical article 500, but exhibiting a greater capability for better phase matching, such as that desired for improved efficiency second harmonic generation. A substrate 601 is shown supporting superimposed waveguide layers 603, 605, 607, and 609. While four superimposed layers are shown, in practice any odd or even number of superimposed layers can be provided. The odd layers (603 and 607) in the sequence can be formed of an optically active transmission medium according to the invention (similarly as medium 105) while the even layers (605 and 609) can be formed of a passive or linear optical medium, as described above. Alternatively, the optically active and passive transmission media layers can be reversed in order. In either instance, but particularly in the latter, an option cladding layer 619 similar to cladding layers of FIG. 1 can be provided.

To achieve useful parametric effects, electromagnetic radiation, indicated by arrow 611 is supplied to the waveguiding layers through input means 613, shown as a prism. In passing through the waveguiding layers to output means 615, shown as a prism, the optically active and passive media layers together alter the form of the electromagnetic radiation, indicated by output arrow 617, so that parametric (e.g., second harmonic) effects are more efficiently generated.

The optical article constructions described above are exemplary of a large variety of possible differing optical article constructions. The present invention is compatible with any conventional construction of an optical article relying on a significant second order polarization susceptibility to produce a useful effect. For example, whereas in connection with FIG. 5 an optical article is disclosed in which the optically active transmission medium surrounds a substrate, which can have linear optical properties, Zyss, cited above, in FIG. 2(d) discloses just the converse arrangement, in which the optically active transmission medium forms a core clad with a shell of a linear optical transmission medium. Zyss also discloses an arrangement in which the optically active transmission medium is located in a groove on the surface of a linear optical transmission substrate. All of the optical article constructions of Zyss exhibiting second order nonpolarization effects can be applied to the practice of this invention and are here incorporated by reference.

An essential component of each of the optical articles of this invention is an optically active transmission medium exhibiting a second order polarization susceptibility greater than $10^{-9}$ $esu$ (preferably greater than $10^{-8}$ $esu$) electrostatic units containing polar aligned molecular dipoles. The molecular dipoles are comprised of an electron acceptor sulfonyl moiety having its $\alpha$ carbon atom substituted with at least two halogen, this sulfonyl moiety being bonded to an electron donor moiety by a linking moiety providing a conjugated $\pi$ bonding system to permit oscillation of the molecular dipole between a lower polarity ground state and a higher polarity excited state. The molecular dipoles are represented by the oscillation (resonance) ground state and excited state extremes, since these lend themselves to representation by chemical formulae. Formula pairs are useful in bracketing the range of structural variance, even though it is recognized that in practice neither of the oscillation extremes may be actually fully realized. The molecular dipoles of this invention are generally represented by Formula Pair 3.

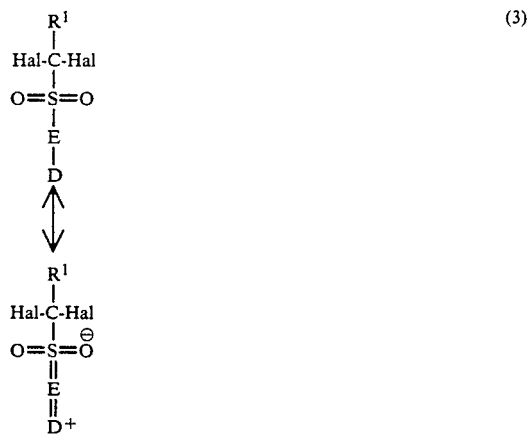

where
- C is the $\alpha$ carbon atom (the carbon linked directly to the sulfur atom) of the sulfonyl moiety,
- D is an electron donor moiety,
- E is a linking moiety, specifically a conjugated $\pi$ bonding system, which provides a pathway for charge transfer resonance,
- Hal is in each occurrence an independently chosen halogen substituent of the $\alpha$ carbon atom, and
- $R^1$ is hydrogen, halogen or R, an optionally substituted hydrocarbon moiety.

The term "$\alpha$ dihalo-substituted sulfonyl" is employed to designate the moiety $-SO_2C(HAL)_2R^1$. From the difinition of $R^1$ above it is apparent that the presence of a third halo substituent of the α carbon atom is not precluded.

The halogen substituents, Hal and $R^1$, can be fluoride, chloride, bromide or iodide substituents. While all of the halides are effective in providing the advantages of the invention, the smaller halides are synthetically preferred.

For convenience the molecular dipoles are named using their ground state structures, unless otherwise noted.

The electron donor moieties can take any convenient conventional form. The electron donor moiety can be an amino moiety. Primary, secondary, and tertiary amino moieties are contemplated for use, with the latter being most preferred and the former being least preferred. Only the secondary and tertiary amino moieties allow for substituent modification of properties similarly as the α dihalo-substituted sulfonyl moiety, and only the tertiary amino moiety produces the most highly polar excited state. When the electron donor moiety is an amino moiety, the molecular dipoles of the invention satisfy Formula Pair 4.

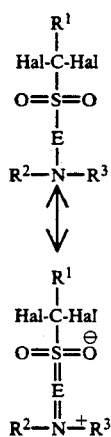

(4)

where

C, E, Hal, E and $R^1$ are as previously described and $R^2$ and $R^3$ are hydrogen or, preferably, optionally substituted hydrocarbon moieties.

Instead of employing an amino group as an electron donor moiety, it is specifically contemplated to employ an oxy or thio electron donor moiety. When such oxy and thio electron donor moieties are employed, the molecular dipoles of the invention satisfying Formula Pair 5.

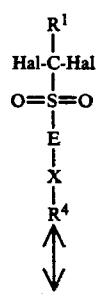

(5)

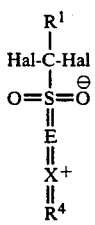

-continued where

C, E, Hal, E and $R^1$ are as previously described $R^4$ is an optionally substituted hydrocarbon moiety, and X is oxygen or sulfur.

The moiety E linking the electron donor and α dihalo-substituted sulfonyl electron acceptor moieties is selected to satisfy three fundamental characteristics. First, it is chosen so that the molecule will be noncentrosymmetric, thereby exhibiting a dipole moment even in its ground state. Second, it is chosen to provide sufficient spatial separation of the electron donor and acceptor moieties to provide a large dipole moment in the polar excited state of the electron donor and acceptor moieties. Third, the linking moiety is chosen to permit efficient oscillation or charge transfer resonance between the ground and excited states. This results in large differences between the excited state and ground state dipole moments.

A conjugated π bonding system can satisfy all three requirements. On its most elemental level such a bonding system can be provided by chains of methine (a.k.a., methenyl and methylidyne) groups, which are (except as specifically noted) to be understood as including substituted forms. Such chains can optionally include one or more aza (—N=) moieties.

To satisfy the requirement for oscillation or charge transfer resonance, it is essential that the resonance path be defined by an even number of atoms. The number of atoms in the resonance path between the electron donor and acceptor is preferably at least 4 and optimally at least 8.

While increasing the number of atoms in the resonance path should increase the excited state dipole moment, it also tends toward nonplanar molecular conformations which lead to losses in hyperpolarizability density (β/V, where V is the transmission medium volume) as well as thermal and other energy losses (e.g., losses in transparency), so that at first diminishing gains and then overall losses result from increasing the number of atoms in the resonance path. It is generally preferred that the number of atoms in the resonance path between the electron donor and acceptor be 20 or less and optimally 14 or less.

Thus, in a more specific form, the molecular dipoles of this invention can be represented by Formula Pair 6

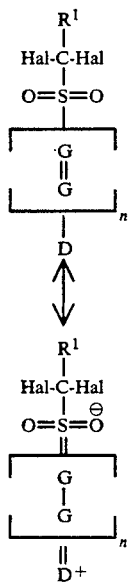

(6)

where
C, D, Hal and $R^1$ are as previously described;
G is independently in each occurrence methine or aza; and
n is 4 to 20, preferably 8 to 14.

For synthetic convenience it is generally preferred that no more than two adjacent G groups be aza groups. Thus, both individual aza (—N=) and diazo (—N=N—) groups are contemplated to be present in the linking moiety.

While the aza groups permit no substitution, the methine groups can be substituted, if desired. Preferred linking moieties are those which have been at least partially rigidized by substituents bridging methine groups in the resonance path. Rigidization of the linking moiety reduces energy dissipation. In a specifically preferred form of bridging substitution of the methine groups in the resonance path, the linking moiety is wholly or, preferably, partially aromatized. Both carbocyclic and heterocyclic aromatization is specifically contemplated.

A specifically preferred class of molecular dipoles satisfying the requirements of the invention are 4-(α dihalo-stubstiltuted sulfonyl)-4'-D-stilbenes, where D is an electron donor moiety, such as an amino, oxy, or thio substituent, as previously defined. In these stilbenes the electron acceptor α dihalo-substituted sulfonyl and electron donor moieties are each bonded to one terminal aromatized portion of the conjugated π bonding linking moiety, with the aromatized portions of the linking moiety being joined by an ethylene (vinylene) group. When the single ethylene linking group of the stilbene is replaced by two or more ethylene groups, within the resonance path chain length limits noted above, highly advantageous analogues are realized. Substitution of individual methine groups with aza groups, particularly in the ethylenic portion of the linkage, are compatible with achieving high β values. The ethylenically expanded and aza substituted stilbene variants are hereinafter referred to as stilbenoid compounds, since they are compounds which share significant property similarities with stilbenes.

In a preferred form of the invention, the stilbenes and stilbenoid compounds can be presented by Formula Pair 7:

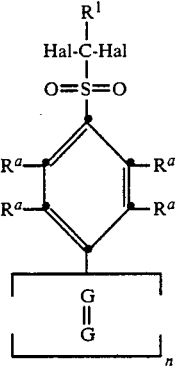
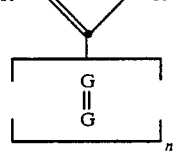
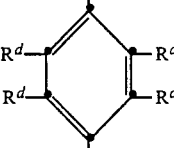
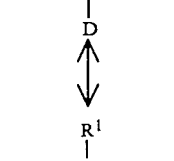
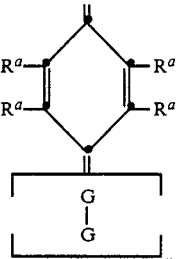
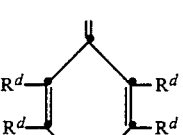

(7)

where
C, D, Hal and $R^1$ are as previously described;
G is independently in each occurrence a methine or aza moiety, with the proviso that no more than two aza moieties are next adjacent;
n is an integer of from 1 to 3;
$R^a$ represent hydrogen, substituents which together with the sulfonyl group $SO_2C(Hal)_2R^1$ collectively enhance the electron acceptance of the phenyl ring to which they are attached, or a combination of both; and
$R^d$ represent hydrogen, substituents which together with the electron donor D collectively enhance the electron donation of the phenyl ring to which they are attached, or a combination of both.

In another preferred form of the invention the terminal methine group attached to the electron acceptor SO$_2$C(Hal)$_2$R$^1$ moiety is replaced by an aza (—N=) group. The α dihalo-substituted sulfonyl and aza groups in combination form a α dihalo-substituted sulfonimino, =N—SO$_2$C(Hal)$_2$R$^1$, group. By including the aza portion of the sulfonimino group as part of the linking moiety E all the relationships previously discussed are applicable; however the sulfonimino group is incompatible with the stilbenoid structures of Formula Pair 7. One preferred class of dipolar compounds exhibiting high levels of hyperpolarizability incorporating a terminal α dihalo-substituted sulfonimino group are represented by Formula Pair 8.

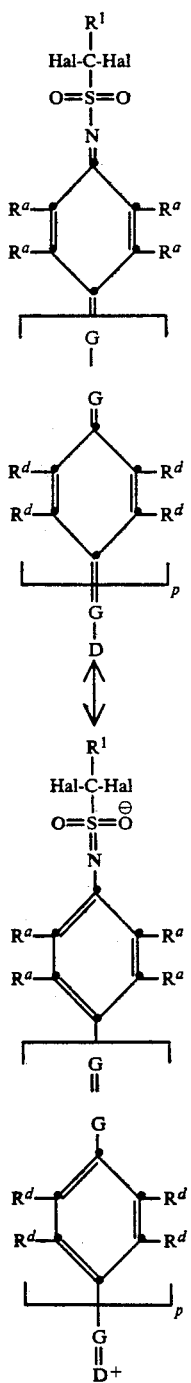

(8)

where

C, D, Hal, R$^1$, R$^a$, and R$^d$ are as previously defined;

G is independently in each occurrence a methine or aza moiety, with the proviso that no more than two aza moieties are next adjacent; and p is 0 or 1.

In Formula Pair 8 neither of the two terminal resonance path atoms of the linking moiety are included in a rigidizing aromatic ring, but the rigidizing aromatic ring or rings are located next adjacent to each resonance path terminal atom of the linking moiety. Note that either 6 or 12 atoms are present in the resonance path provided by the linking moiety.

When electron donation is from a nitrogen atom, a terminal aromatic rigidizing ring system formed by a 4-pyridinium and 4-pyrido tautomer is possible, as illustrated by the preferred dipolar compounds of Formula Pair 9.

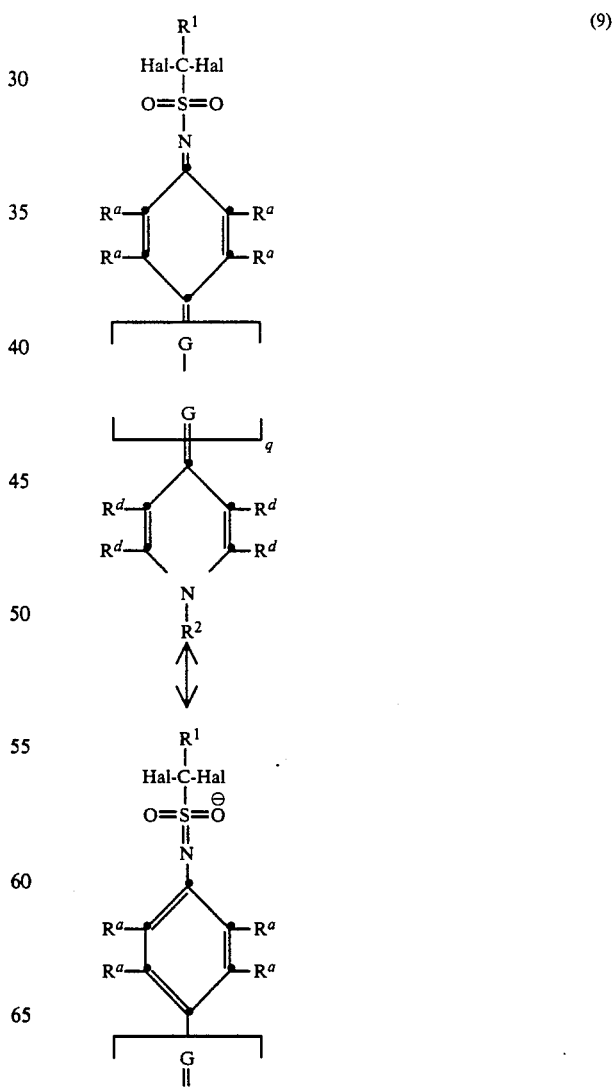

(9)

-continued

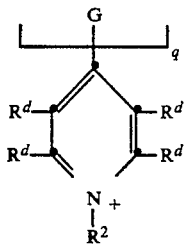

where

C, Hal, $R^1$, $R^2$, $R^a$, and $R^d$ are as previously defined;

G is independently in each occurrence a methine or aza moiety, with the proviso that no more than two aza moieties are next adjacent; and q is an integer of from 0 to 3.

In specifically preferred forms of the compounds of Formulae 7 through 9 the two aromatic rings are coplanar. To preserve the coplanarity of the rings it is preferred that, when the G groups of the formulae are methine groups, they remain unsubstituted. However, sterically compact methine substituents compatible with copolanarity, such as fluorine and lower alkyl groups of from about 1 to 3 carbon atoms, are contemplated.

For synthetic simplicity the aromatic rings can be left unsubstituted while achieving high levels of performance. It is appreciated, however, that the dipole moment can be increased by employing in available phenylene ring positions substituents which supplement the electronic asymmetry induced by the electron acceptor α dihalo-substituted sulfonyl moiety and the electron donor moiety D. Electron donating and accepting properties of phenyl rings imparted by substitution have been extensively studied and quantified by the assignment of Hammett sigma values. Substituents which render phenyl rings electron accepting are assigned positive Hammett sigma values while negative Hammett sigma values are assigned to substituents which render phenyl rings electron donating. Hydrogen atoms attached to phenyl rings are assigned a Hammett sigma value of zero. By algebraically summing the Hammett sigma values of substituents to a phenyl ring it is possible to arrive at a net Hammett sigma value for the phenyl ring that is indicative of whether the substituted phenyl ring is electron accepting (indicated by a positive net Hammett sigma value) or electron donating (indicated by a negative net Hammett sigma value). Further, the algebraic sum of the substituent Hammett sigma values quantifies the degree to which the substituted phenyl ring is electron accepting or donating.

Lange's Handbook of Chemistry, 12 Ed., McGraw-Hill, 1979, Table 3-12, pp. 3-134 to 3-138, here incorporated by reference, lists Hammett sigma values for a large number of commonly encountered substituents. Ortho and para position substituents usually exhibit identical Hammett sigma values, which differ to only a limited degree from meta sigma values and can, in any event, be determined from published lists. Exemplary simple substituents and their published meta Hammett sigma values are primary and second alkyl substituents, such as methyl $\sigma = -0.07$, ethyl $\sigma = -0.07$, n-propyl $\sigma = -0.05$, i-propyl $\sigma = -0.07$, n-butyl $\sigma = -0.07$, and sec-butyl $\sigma = -0.07$. These alkyl substituents are synthetically convenient and therefore contemplated. Alkyl substituents containing tertiary carbon atoms and particularly tertiary alkyl groups tend to be even more highly electron donating. Aryl groups such as phenyl, α-naphthyl, and β-naphthyl groups are contemplated (e.g., phenyl $\sigma = +0.06$). Other useful and specifically contemplated hydrocarbon substituents include alkaryl substituents (e.g., p-methylphenyl), aralkyl substituents (e.g., benzyl $\sigma = -0.05$ and phenethyl), alkenyl substituents (e.g. vinyl $\sigma = +0.02$), aralkenyl substituents (e.g., 2-phenylvinyl $\sigma = +0.14$), alkynyl substituents (e.g., ethynyl $\sigma = +0.21$, propargyl, and 2-butynyl), and aralkynyl substituents (e.g., phenethynyl $\sigma = +0.14$). Substituted hydrocarbon substituents are also contemplated, such as haloalkyl substituents (e.g., bromomethyl, chloromethyl $\sigma = -0.12$, fluoromethyl, and iodomethyl), haloaryl substituents (e.g., p-bromophenyl, m-bromophenyl, and p-chlorophenyl, and hydroxyalkyl substituents (e.g., hydroxymethyl $\sigma = +0.08$).

It is specifically preferred to select $R^a$ substituents independently from among known phenyl ring substituents having a positive Hammett sigma value and to select $R^d$ substituents independently from among known phenyl ring substituents having a negative Hammett sigma value. However, it is recognized that combinations of $R^a$ substituents are possible, some of which are electron donating, some of which are essentially neutral, and some of which are electron accepting. Combinations of $R^a$ substituents are possible which, together with the α dihalo-substituted sulfonyl, $SO_2C(Hal)_2R^1$, algebraically sum to a positive net Hammett sigma value. Preferably the combination of $R^a$ substituents, without inclusion of the α dihalo-substituted sulfonyl group, provide a positive net Hammett sigma value. Similarly, any combination of $R^d$ substituents is possible which, together with the electron donor, D, algebraically sum to a negative net Hammett sigma value. Preferably the combination of $R^d$ substituents, without inclusion of the substituent D, provide a negative net Hammett sigma value.

To avoid perturbation of the desired resonance pattern no one $R^a$ substituent should have a Hammett sigma value more positive than that of the α dihalo-substituted sulfonyl electron acceptor moiety, and no one $R^d$ substituent should have a Hammett sigma value more negative than that of the electron donor moiety D. It is also important to bear in mind that large β values depend not only on achieving a large dipole moment, but also on achieving a large difference between the excited state and ground state dipole moments. Thus substituents must be chosen from among those which are compatible with reversible charge transfer—i.e., charge transfer resonance. Thus substituents of the very highest and lowest Hammett sigma values are preferably avoided.

It is recognized that two adjacent $R^a$ or $R^d$ substituents can, if desired, together form a ring fused with the phenyl ring to which they are attached. Fused benzo rings are specifically contemplated. Polycyclic aromatic rings, such as naphthyl and anthracyl aromatic rings, in the linking moieties are therefore possible. Fused benzo rings are compatible with the coplanarity of the aromatic nuclei and, unless they are themselves substituted, have little effect on electronic asymmetry. It is further recognized that $R^2$, $R^3$, and $R^4$ can, if desired, form with an $R^d$ substituent ortho to D a fused ring, preferably of 5 or 6 member ring. For example, the amino electron donor moiety in Formula Pair 7 can form with the linking moiety a julolidene ring. Numerous other fused rings containing the heteroatom of the electron donor moiety are possible. However, while within the contemplation of useful dipole molecular structures, fused ring substituent patterns are not generally preferred, since they increase molecular bulk, thereby reducing the hyperpolarizability density $\beta/V$ (defined above), while lacking in many instances the synthetic convenience of monovalent substituents.

In their preferred forms R, $R^2$, $R^3$, and $R^4$ are monovalent hydrocarbon substituents. Specifically contemplated are all aliphatic hydrocarbon substituents containing from 1 to about 40 carbon atoms—e.g., alkyl, alkenyl, and alkynyl, including all cyclic forms thereof; all aromatic hydrocarbon substituents containing from 6 to 20 carbon atoms (preferably 6 to 10 carbon atoms—i.e., phenyl and naphthyl); and hydrocarbon substituents which are composites of these aliphatic and aromatic substituents—e.g., alkaryl, aralkyl, alkaralkyl, aralkaryl, etc. The aliphatic substituents and substituent moieties can contain unsaturation for steric or synthetic convenience. All of the hydrocarbon substituents can, optionally, themselves be substituted to facilitate polar alignment in the transmission medium.

The hydrocarbon and substituted hydrocarbon substituents of the electron acceptor and donor moieties can be chosen, if desired, to enhance the electron accepting or donating functions of the electron acceptor and donor moieties, respectively. Hammett sigma values of the electron donor and electron acceptor moieties are useful for this purpose, as explained above in connection with the selection of $R^a$ and $R^d$ substituents. For example, the Hammett sigma values of a primary amino group (—$NH_2$); secondary amino groups, such as alkylamino (e.g., —$NHCH_3$, —$NHCH_2CH_3$, and —N—H—n—$C_4H_9$); and tertiary amino groups, such as dialkylamino (e.g., dimethylamino) range from $-0.04$ for the primary amino group to $-0.83$, with the secondary and tertiary amino groups generally having Hammett sigma values more negative than $-0.20$.

Since a large variety of substituents are compatible with producing a molecular dipole, the determining factor in selecting hydrocarbon and substituted hydrocarbon substituents of the electron acceptor and donor moieties is in most instances related to the approach chosen for achieving polar alignment of the molecular dipoles in forming a transmission medium. The approaches to molecular dipole alignment discussed below place varying requirements on the molecular characteristics of the dipole and its substituents, but, because of their diversity, the various alignment techniques in aggregate allow a very wide latitude of choice in selecting molecular dipole molecules for incorporation in the transmission bodies of the optical articles of this invention.

In some instances dipoles satisfying the requirements of this invention can be synthesized which, by reason of their molecular configuration, form crystals in which the dipole molecules are in polar alignment. By growing such crystals at a slow rate under conditions of near equilibrium with their mother liquor macroscopic crystals suitable for use as transmission bodies in the optical devices of this invention can be formed. Unfortunately, the requirement of spontaneous crystallization of the molecular dipoles in a polar aligned geometric arrangement is too sterically limiting to be applicable to a large variety of molecular dipoles.

An approach to alignment of molecular dipoles that can be practiced with any soluble molecular dipole is to form the transmission medium of a solution containing the molecular dipole as a solute at any concentration of from about 1 percent by weight up to saturation. By placing the solution in a sealed container, such as a glass receptacle, the transmission medium can be given its desired geometrical shape. When it is desired to create an optical effect requiring a high level of second order polarization susceptibility in the transmission medium, such as second harmonic generation, the transmission medium is placed in an electrical field, which causes the dissolved dipoles to align themselves in the field. By passing electromagnetic radiation through the transmission medium a second harmonic frequency can be generated. Although this arrangement allows a broad choice of molecular dipoles, the liquid state of the transmission medium can be inconvenient. Further, the application of an electric field during electromagnetic radiation transmission is incompatible with some of the optical article uses described above and, where practicable, may nevertheless be inconvenient.

Another approach to forming optically active layers satisfying the requirements of the invention can be practiced by producing self-assembled films. The term "self-assembled" is employed to indicate that the film can be formed from successive monomolecular layers that are each spontaneously oriented on deposition. One technique for forming optically active self-assembled films satisfying the requirements of this invention can be practiced by modifying the teachings of Sagiv U.S. Pat. No. 4,539,061, here incorporated by reference. Sagiv teaches to form layers on substrates by sequential deposition. A first monomolecular layer is formed by reacting with or adsorbing on the surface of a substrate a compound consisting of a hydrocarbon linking moiety joining a bonding group and a bonding group precursor. The first layer is deposited on the substrate in a spatially oriented manner with the bonding groups adsorbed or bonded to the substrate surface and the bonding group precursors remote from the substrate surface. After the first layer is formed, the bonding group precursors remote from the substrate surface are modified so that they can provide bonding sites. A second layer can now be formed on the first layer similarly as the first layer is deposited on the substrate. After the second layer is formed, the coating sequence can be again repeated, if desired, until a film of the desired thickness is realized.

One very significant difference between the self-assembled films of this invention and those disclosed by Sagiv is that instead of a hydrocarbon linking moiety, as taught by Sagiv, this invention employs two hydrocarbon moieties joined by a molecular dipole moiety, wherein one of the bonding and precursor groups and one the hydrocarbon moieties is the substituent R of the sulfonyl electron acceptor moiety and the remaining of the bonding and precursor groups and the other hydrocarbon moiety is at least one of $R^2$, $R^3$, and $R^4$. The entire molecular dipole molecule employed to form a self-assembled film can be described by Formulae 10 or 11:

(10)

(11)

where
E is a linking moiety as previously described;
$D^1$ is an electron donor moiety differing from $-NR^2R^3$ or $-XR^4$, previously described, only by requiring that at least one of $R^2$, $R^3$, or $R^4$, when present, be further substituted with $B^1$ or $P^1$;
R' is a hydrocarbon or substituted hydrocarbon moiety differing from R, previously described, only by requiring further substitution with $B^1$ or $P^1$;
$B^1$ is a bonding group; and
$P^1$ is a bonding group precursor.

Any of the bonding groups described by Sagiv, cited above, can be employed. Among groups disclosed by Sagiv to be useful as bonding groups are the following:
(a) Silane moieties, such as monochloro, dichloro, trichlorosilanes, silanols, silazanes;
(b) Phosphate groups;
(c) Sulfate and sulfonic groups;
(d) Carboxoyl functions, such as carboxylic acids, amides, carboxoyl halides, and hydrazides;
(e) Amino and hydrazino groups;
(f) Hydroxyl groups;
(g) Boronic acid groups;
(h) Aldehyde groups;
(i) Halides;
(j) Diazonium salt moieties; and
(k) Pyridine moieties.

Sagiv discloses a large variety of bonding group precursors and varied techniques for their conversion to bonding groups. Such bonding group precursors and conversion techniques can be employed to the extent that they are compatible with the preservation of the molecular dipole. In general, however, the draconian approaches (e.g., ozonolysis) suggested by Sagiv are incompatible with preservation of the molecular dipoles of this invention.

In a preferred form $P^1$ can take the form of a precursor that can be hydrolyzed under relatively mild conditions to provide a hydroxy functional group. Many of the conventional techniques for forming alcohols can be employed. For example, when the bonding group precursor is a halide substituent, the halide can be readily displaced by hydrolysis to provide a hydroxy group. Ester, amide, alkylthio, arylthio, aryloxy, and alkoxy groups can also be readily hydrolyzed by known techniques to create a hydroxy substituent on the hydrocarbon of the molecular dipole.

In a specifically preferred form of the invention the substrate chosen for the construction of self-assembled film is an optically transparent siliceous support, such as quartz or glass. Siliceous supports are known to exhibit hydroxyl groups at their surface. A monomolecular layer of a compound satisfying Formula 10 or 11 is spread on the siliceous substrate. The preferred bonding group is $-SiCl_3$. Reaction of the bonding group with the substrate in the presence of water produces a first layer of the following structure:

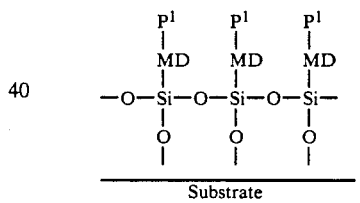

where
MD represents $-R'-C(Hal)_2-SO_2-E-D^1-$ defined above in connection with Formulae 10 and 11 and
$P^1$ is preferably a bonding group precursor that can be employed to form a hydroxy group by hydrolysis.

When the bonding group precursor is converted to a hydroxy group, a second layer similar to the first can be formed on the substrate. By repeating this sequence of steps any desired number of layers can be formed. The following illustrates a preferred self-assembled film formed by three successive depositions:

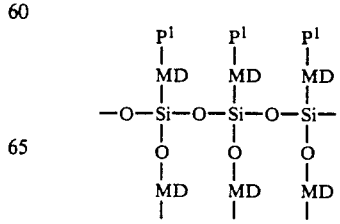

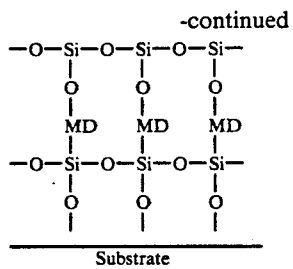

It is immaterial whether P¹ in the final layer remains as a bonding group precursor or is converted to a hydroxyl group.

Optically active layers in the same thickness ranges noted above in connection with LB films can be produced. Since crosslinking of each monomolecular layer formed is possible with proper bonding group selection, even thicker and more stable optically active layers can be produced, if desired.

Where relatively thick optically active elements, such as those greater than about 2000 Å in thickness and particularly those greater than 1 μm in thickness, are desired, forming the optically active layer in successive monomolecular deposition sequences can be time consuming. Therefore thicker optically active elements according to the invention are preferably constructed by macroscopic construction techniques—that is, construction techniques that are capable of forming many or all molecular layers of the optically active element simultaneously and therefore do not require repetition as a function of the number of molecular layers.

One preferred macroscopic construction approach is to pattern (e.g., spin cast or otherwise suitably shape) a fluid containing the molecular dipole in an unordered state, align (pole) the molecular dipoles in an externally applied electric field, and convert the fluid to a viscuous or solid form capable of holding the molecular dipoles in polar alignment when the external field is no longer present. A number of different variations on this general approach are possible.

If desired, the molecular dipoles of this invention can be formed into an optically active element by placing the molecular dipole in a transparent polymeric binder, raising the temperature of the binder above its glass transition temperature, externally applying an electric field (also commonly referred to as poling) to align the molecular dipoles in the polymer, and then cooling the optically active element below the glass transition temperature of the polymer with the external field still applied. When the external field is removed, the molecular dipoles will remain in polar alignment. The specific technique described by Singer et al, "Second Harmonic Generation in Poled Polymer Films", *Appl. Phys. Lett.*, Vol. 49, No. 5, 8/4/86, pp. 248–250, here incorporated by reference, can be employed, wherein poly(methyl methacrylate is employed as a binder). This technique is generally useful with transparent linear polymers. The term "transparent" is employed throughout, unless otherwise stated, to indicate minimal adsorption of electromagnetic radiation at wavelengths supplied to or generated within the optical articles of this invention. Useful transparent linear polymers can be selected from a wide variety of such polymers known to be useful in the construction of transparent films. Such linear polymers include cellulose nitrate and cellulose esters, such as cellulose triacetate and cellulose diacetate; polystyrene; nylons and polyamides; homo- and co-polymers of vinyl chloride; polyaldehydes—e.g., poly(vinyl acetal), poly(vinyl butyral), etc.; polycarbonates; homo- and co-polymers of olefins, particularly α-olefins, such as polyethylene and polypropylene; polyesters of dibasic aromatic carboxylic acids with divalent alcohols, such as poly(ethylene terephthalate); synthetic rubbers—e.g., homo- and co-polymers of butadiene; high molecular weight alkylene oxides—e.g., ethylene glycols having weight average molecular weights of from 4000 to 4,000,000; poly(vinyl esters)—e.g., poly(vinyl acetate); acrylonitriles and methacrylonitriles; and acrylic and methacrylic acid esters—e.g., poly(methyl metacrylate), poly(methyl acrylate), as well as their copolymers and homologues.

In the foregoing macroscopic assembly technique the externally applied field acts primarily on the molecular dipoles to achieve their polar alignment. An important variation of this assembly technique is to employ linear polymers having pendant groups which are capable of being aligned by the externally applied electric field. Since both the pendant groups and the externally applied electric field act on the molecular dipoles, a higher order of polar alignment for a selected field gradient can be achieved or, alternatively, the same order of polar alignment can be achieved with a lower field gradient.

Linear polymers which are capable of supplementing the electric field in aligning the molecular dipoles in the externally applied field are characterized by linear (non-crosslinked) backbones, dipolar pendant groups, and a linkage of each dipolar pendant group with the polymer backbone which permits spatial reorientation of the pendant group independently of the orientation of the polymer backbone. These molecular requirements describe the characteristics of polymers known to form liquid crystals. In the parlance of liquid crystals, the liquid crystal polymer acts as a host while the molecular dipole acts as guest in the liquid crystal medium. In a preferred form, liquid crystal polymers contain a linear backbone formed by vinyl addition. The dipolar pendant groups are aromatic groups ring substituted with both electron withdrawing and electron donating substituents. Such substituents can be selected by reference to published Hammett sigma values, as described above. The combined effect of the substituents on the aromatic ring is to create a dipole moment in the pendant group. The planar nature of the aromatic rings allows close packing densities with minimal steric hindrances. Preferred linking groups are linear divalent alkylene moieties of from about 1 to 12, optimally 4 to 10, carbon atoms, since they permit the pendant groups freedom of orientation with respect to the polymer backbone with minimal increase in molecular weight.

Specifically preferred polymers of this type are acrylate and methacrylate homo- and co-polymers in which the omega (i.e., last) carbon atom of an alkyl ester forming group is substituted with an aromatic dipolar pendant group. These and closely related polymers illustrated by Formula 12:

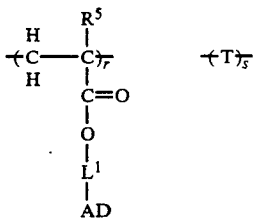

(12)

where
- AD is an aromatic dipolar substituent;
- $L^1$ is a divalent linking group containing a $-(CH_2)_m-$ moiety;
- m is an integer of from 1 to 12, preferably 4 to 10;
- $R^5$ is hydrogen, halogen, or alkyl of from 1 to 6 carbon atoms;
- r is 1.0 to 0.5;
- s is 0 to 0.5; and
- T is a repeating unit derived from a vinyl addition monomer.

The aromatic dipolar substituent AD can take any one or combination of the forms:

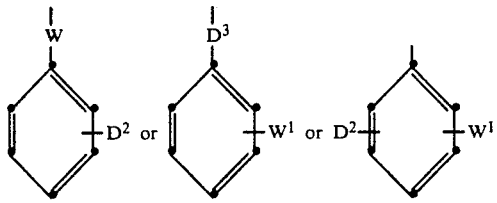

where
- $D^2$ and $D^3$ are monovalent and divalent groups, respectively, exhibiting negative Hammett sigma values and
- W and $W^1$ are divalent and monovalent groups, respectively, exhibiting positive Hammett sigma values.

The following are illustrative of suitable liquid crystal polymers contemplated for use as binders in the optical articles of this invention:

LC-1 Poly{6-[4-(4-cyanophenoxycarbonyl)phenoxy]hexyl methacrylate-co-6-[4-(4-methoxyphenoxycarbonyl)phenoxy]hexyl methacrylate} ((50:50)

LC-2 Poly{4-[4-carboxyphenoxycarbonyl)phenoxy]butyl acrylate-co-4-(4-methoxyphenoxycarbonyl)phenoxy]butyl acrylate} (60:40)

LC-3 Poly{10-[4-(4-nitrophenoxycarbonyl)phenoxy]decyl methacrylate-co-6-[4-(4-phenoxycarbonyl)phenoxy]hexyl methacrylate} (40:60)

LC-4 Poly{6-[4-(4-cyanophenoxycarbonyl)phenylthio]hexyl methacrylate-co-methyl methacrylate} (70:30)

Generally concentrations of molecular dipole of at least about 1 percent (preferably at least 10 percent) by weight, based on the weight of the binder forming the transmission medium are contemplated. Total weight of the transmission medium are contemplated.

In addition to allowing macroscopic assembly the technique of achieving polar alignment above the glass transition temperature of a polymeric binder followed by cooling exhibits the advantages of permitting an extremely wide choice of R, $R^2$, $R^3$, and $R^4$ substituents as well as a broad choice of linear polymers, including but not limited to liquid crystals. The polymers lend themselves to the formation of optically active films by spin casting.

An important disadvantage of macroscopic assembly by dissolving a molecular dipole in a separate polymeric binder is the limited concentration of the molecular dipole that can be achieved. Because of the limited solvent capabilities of linear polymers and the risk of phase separation, including as a worst case crystallization of the molecular dipole as a separate phase on cooling, the concentration of the molecular dipole in the binder cannot normally exceed about 20 percent by weight, based on the weight of the binder. A further disadvantage is that ratio of polymeric binder to molecular dipole can vary from one preparation to the next, allowing for performance variances from one optical article to the next, unless this ratio is carefully controlled.

One preferred technique for the macroscopic assembly of molecular dipoles in polar alignment is taught by Scozzafava et al U.S. Pat. No. 4,886,339, the disclosure of which is here incorporated by reference. As therein disclosed, the molecular dipoles are held in polar alignment in a crosslinked polymeric binder to form the optically active transmission medium. The molecular dipoles are dissolved in a fluid precursor of the binder, such as a monomer or oligomer capable of polymerizing to form a crosslinked polymer or a linear polymer capable of crosslinking to form a crosslinked binder. The molecular dipoles are aligned (poled) in an externally applied DC electric field, and crosslinking is undertaken with the field still applied.

It is an advantage of this approach that it not necessary at any time to heat the materials above ambient temperatures, although mild heating is not incompatible. It is further important to note that the linear polymers employed as binder precursors are to be distinguished from the linear polymers previously employed as binders in the art. Whereas the prior art linear polymer binders must be so highly viscous as to be apparently solid at room temperatures, the linear polymers employed in the practice of this invention as binder precursors can be and preferably are relatively low viscosity liquids at room temperatures. In addition to avoiding any necessity of heating prior to or during poling, the lower molecular weight linear polymers are capable of dissolving higher proportions of the molecular dipoles than are the relatively higher molecular weight linear polymer binders of the prior art.

While any convenient technique can be employed for converting the binder precursor into a crosslinked binder, photocrosslinking is preferred. As employed herein the term "photocrosslinking" is employed to designate a reaction stimulated by exposure to electromagnetic radiation that either converts photosensitive monomers into crosslinked polymers or crosslinks linear photosensitive polymers. Useful photosensitive binder precursors capable of producing crosslinked polymeric binders can be chosen from among those employed in conventional negative working photoresist compositions.

Another preferred technique for the macroscopic assembly of molecular dipoles in polar alignment is taught by Robello et al U.S. Pat. No. 4,796,971, the disclosure of which is here incorporated by reference. As therein taught, the molecular dipoles each contain at least one crosslinking moiety. This permits a separate binder to be eliminated or employed on a optional basis. The molecular dipoles while being held in polar alignment in an externally applied field can be crosslinked to form a rigid crosslinked polymeric matrix.

The molecular dipoles can be generally represented by Formula Pair 13: (13)

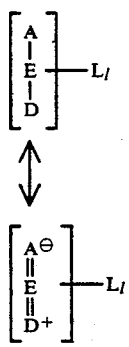

where
- A is an α dihalo-substituted sulfonyl electron acceptor moiety;
- D is an electron donor moiety;
- E is a linking moiety, specifically a conjugated π bonding system, which provides a pathway for charge transfer resonance;
- l is an integer of from 1 to 4; and
- L is a crosslinking moiety.

For the molecular dipoles to form a crosslinked polymeric matrix it is necessary that they be linked in polar alignment to at least three adjacent molecular dipoles. For this to be achieved each molecular dipole requires at least one crosslinking moiety L. Where a single crosslinking moiety is provided for each molecular dipole, the crosslinking moiety must itself be capable of linking at least three adjacent molecular dipoles in order to form a crosslinked polymeric matrix. This has been illustrated above by the siloxy groups in the self-assembled layers.

A preferred approach for achieving macroscopic construction of an optically active transmission medium is to employ molecular dipoles which are monomers each containing two or more photopolymerizable substituent groups. Flexible linkages are required in the molecule so that the photopolymerizable substituent groups are allowed freedom of orientation while the molecular dipole remains in polar alignment with the externally applied electric field.

The photopolymerizable substituent groups can be viewed as substituents of or replacements for any one of the various groups R, $R^2$, $R^3$, $R^4$, $R^a$, and $R^d$ in the molecular dipoles described above satisfying the requirements of the invention. Since the α dihalo-substituted sulfonyl electron acceptor moiety differs from conventional electron acceptor moieties known to the art, such as nitro and cyano groups in providing a substitution site, unique crosslinking patterns are made possible by the α dihalo-substituted sulfonyl moiety.

In still another preferred form the molecular dipoles can take the form of polar aligned pendant groups in linear homo- and copolymers. Such embodiments are the specific subject matter of Robello et al, "An Optical Article Containing a Linear Polymer Exhibiting a High Level of Second Order Polarization Susceptibility", Ser. No. 241,740 filed Sept. 8, 1988, commonly assigned, now U.S. Pat. No. 4,900,127. As therein taught, from 5 to 100 percent of the repeating units of a vinyl addition polymer can contain repeating units containing a molecular dipole as a pendant group. In one preferred from the linear polymers are copolymers in which from 5 to 35 percent of the repeating units contain a molecular dipole as a pendant group while the remaining repeating units can be derived from any convenient vinyl addition polymer. For example, the remaining repeating units can take the form

shown above in Formula 12. Other specifically contemplated forms of the copolymerized repeating units are esters and nitriles of 2-alkenoic acids, such as acrylic and methacrylic acid. Methyl and ethyl acrylates and methacrylates, acrylonitrile, and methacrylonitrile are specifically preferred examples of these repeating units.

In a preferred form the repeating units containing a molecular dipole satisfying the requirements of the invention can be represented by Formula 14:

$$\begin{array}{c} \phantom{+} \text{H} \quad R^5 \\ +\text{C}\!-\!\text{C}\!+\! \\ \phantom{+} \text{H} \quad \underset{|}{\text{C}}=\text{O} \\ \phantom{+++++} \underset{|}{\text{O}} \\ \phantom{+++++} \underset{|}{L^1} \\ \phantom{+++++} \text{MD} \end{array} \quad (14)$$

where
- $L^1$ is a divalent flexible spacer moiety as previously described;
- MD is any of the molecular dipole structures described previously; and
- $R^5$ is hydrogen, halogen, or alkyl of from 1 to 6 carbon atoms, as previously described.

It is apparent that when $R^5$ is hydrogen or methyl the repeating unit is derived from an acrylate or methacrylate ester, respectively. These are the most common alkenoic acid esters employed in vinyl addition polymerization, but a variety of variants are known and can be employed alternatively, if desired. The acrylate and methacrylate esters are advantageous in offering the least molecular bulk.

In one preferred form molecular dipole MD along with the flexible spacer moiety $L^1$ can be represented by Formula Pair 15:

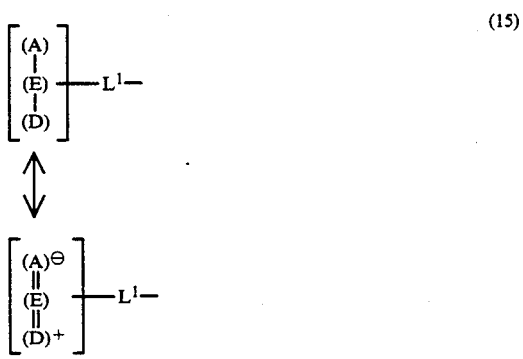

where
- (A) is a sulfonyl electron acceptor moiety satisfying the requirements of the invention;
- (D) is an amino electron donor moiety;

(E) is a linking moiety, specifically a conjugated π bonding system consisting of two terminal carbocyclic aromatic rings linked through 1 to 3 vinyl groups; and $L^1$ is a flexible spacer moiety.

As in the case of forming a crosslinked repeating unit containing molecular dipole, linking sites to the molecular dipole can be provided through any of $R'$, $R^2$, $R^3$, $R^a$, and $R^d$. Again, for the reasons set forth above, only with the α-dihalo-substituted sulfonyl electron acceptor moiety of the invention, is it possible to attach the molecular dipole through the electron acceptor moiety.

In a specifically contemplated form of the invention the repeating units containing molecular dipole pendant groups can satisfy Formula 16:

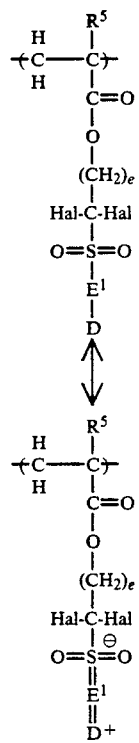

(16)

where
D is an electron donor moiety;
E' is a 4,4'-stilbene linking moiety;
Hal is a halogen substituent;
e is an integer of from 1 to 12; and
$R^5$ is as previously described.

When the optical transmission medium includes a linear polymer, whether including or separate from the molecular dipoles, the polymers preferably have molecular weights (weight average, also designated $M_w$) in the range of from about 10,000 to 200,000, optimally from about 15,000 to 120,000. Polymer molecular weights, unless otherwise indicated are understood to be measured by gel permeation chromatography (GPC) using differential refractive index differential and polystyrene standards. A molecular weight determination procedure of this type is described in detail in "Modern Size Exclusion Chromatography", W. W. Yau, J. J. Kirkland, and D. D. Bly, Wiley Interscience, J. Wiley and Sons, 1979.

The specific selection of materials forming the optically active transmission media will be influenced by the wavelengths of electromagnetic radiation the transmission be used to propagate. The preferred optical articles of this invention are those which exhibit the lowest possible absorptions of electromagnetic radiation in the optically active transmission medium. For optical articles which are intended to propagate a single wavelength or range of wavelengths of electromagnetic radiation, transmission media are employed which exhibit absorption minima within the wavelength region of propagation. Where the optical article itself receives electromagnetic radiation of one wavelength and internally produces for transmission electromagnetic radiation of a differing wavelength, the transmission medium is preferably chosen to exhibit minimal absorptions in both spectral regions. For example, if it is intended to employ an optical article according to this invention for second harmonic generation in response to infrared radiation received from a laser, such as a laser emitting in the 800 to 1600 nm region of the spectrum, the linear polymers are chosen to exhibit the lowest levels of absorption possible at the laser wavelength in the infrared and at the wavelength of the second harmonic in the visible spectrum.

EXAMPLES

The advantages of the invention can be further appreciated by considering a specific strict comparison of a typical embodiment of this invention with a corresponding embodiment disclosed by Ulman et al U.S. Pat. No. 4,792,208, differing solely by the absence of substituents to the α carbon atom of the sulfonyl electron acceptor of the molecular dipole.

The noncentrosymmetric molecular dipole 4'-(N,N-dibutylamino)-4-(trifluoromethyl)sulfonyldiazostilbene (hereinafter referred to as EMP-1) satisfying requirements of this invention by having three fluoro substituents to the α carbon atom of its sulfonyl electron acceptor moiety was synthesized in the following manner:

To a stirred solution of 4-trifluoromethylsulfonylaniline (2.25 g, 0.01 mol) in 40 mL of 10% HCl at 0° C. was added 10.0 g (0.15 mol) of sodium nitrate in 10 mL of water over 1 hour. The reaction mixture was stirred for an additional half hour, at which time 3.9 g (0.048 mol) of sodium acetate was added. To this mixture was then added N,N-dibutylaniline (2.5 g, 0.012 mol) producing a red precipitate. The solid formed was collected, washed with water, and air dried. The crude solid was chromatographed on dry silica with 10% acetone in dichloromethane as the eluent. Crystallization from 1:2 heptane:toluene yield 1.7 g (40%) of red crystals, m.p. 94°–96° C.

$^1$H NMR (CDCl$_3$)δ: 1.00(t, J=7.3 Hz, 6H); 1.40 (m, 4H); 1.64 (m, 4H); 3.40 (t, J=7.4 Hz, 4H); 7.30 (AB, $J_{AB}$=9.1 Hz, Δv=355 Hz, 4H); 8.00 (AB, $J_{AB}$=8.6 Hz, Δv=29.6 Hz, 4H).

Analysis for $C_{21}H_{26}N_3O_2SF_3$ Calculated: C,57.13; H,5.94; N,9.52; S,7.26. Found: C,56.90; H,5.83; N,9.45; S,7.48.

4'-(N,N-dibutylamino-4-methylsulfonyldiazostilbene (hereinafter referred to as CMP-1) was employed as a control.

By measuring the product μβ for each of EMP-1 and CMP-1, namely the product of the dipole moment and the second order polarizability, and then dividing by the calculated dipole moment, the following relationships were determined:

| Molecular Dipole | β (electrostatic units) |
|---|---|
| CMP-1 | 64.5 × 10$^{-30}$ |
| EMP-1 | 125 × 10$^{-30}$ |

In other words, the second order polarizability of EMP-1 was doubled as compared to CMP-1 merely by the fluoro substitution for the methyl group hydrogen. Thus, the invention provides second order polarizabilities of greater than $1 \times 10^{-28}$ esu. Since $\chi^{(2)}$ advantages follow predictably from $\beta$ advantages, the $\beta$ advantage can be readily translated into optical articles containing for the transmission of electromagnetic radiation a medium exhibiting a superior second order polarization susceptibility greater than $10^{-9}$ electrostatic units.

The invention has been described in detail with particular reference to preferred embodiments thereof, but it will be understood that variations and modifications can be effected within the spirit and scope of the invention.

What is claimed is:

1. An optical article containing, for the transmission of electromagnetic radiation, a medium exhibiting a second order polarization susceptibility greater than $10^{-9}$ electrostatic units comprised of polar aligned noncentrosymmetric molecular dipoles having a hydrophobic electron donor moiety linked through a conjugated $\pi$ bonding system to a sulfonyl electron acceptor moiety to permit oscillation of the molecular dipole between a lower polarity ground state and a higher polarity excited state, characterized in that the sulfonyl electron acceptor moiety includes at least two halogen substituents of its α carbon atom.

2. An optical article according to claim 1 further characterized in that means are provided for directing electromagnetic radiation to said transmission medium.

3. An optical article according to claim 1 further characterized in that means are provided for placing an electric field across said transmission medium.

4. An optical article according to claim 3 further characterized in that said biasing means includes at least one transparent electrode in contact with said transmission medium.

5. An optical article according to claim 1 further characterized in that said transmission medium lies in contact with a linear waveguide for electromagnetic radiation.

6. An optical article according to claim 1 further characterized in that said transmission medium includes a polymeric binder.

7. An optical article according to claim 6 further characterized in that said molecular dipoles are bonded to said polymeric binder.

8. An optical article according to claim 1 further characterized in that said molecular dipoles are further comprised of the following moieties:

where

C is the α carbon atom of the sulfonyl atom,

D is an electron donor moiety,

E is a conjugated $\pi$ bonding system, which provides a pathway for charge transfer resonance, Hal is in each occurrence an independently chosen halogen substituent of the α carbon atom, and $R^1$ is hydrogen, halogen or an optionally substituted hydrocarbon moiety.

9. An optical article according to claim 1 further characterized in that said molecular dipoles are further comprised of the following moieties:

```
        R¹
        |
     Hal-C-Hal
        |
      O=S=O
        |
        E
        |
     R²—N—R³
        ↕
        R¹
        |
     Hal-C-Hal
        |    ⊖
      O=S=O
        ‖
        E
        ‖
     R²—N⁺—R³
``` where

C is the α carbon atom of the sulfonyl atom,

E is a conjugated $\pi$ bonding system, which provides a pathway for charge transfer resonance, Hal is in each occurrence an independently chosen halogen substituent of the α carbon atom, $R^1$ is hydrogen, halogen or an optionally substituted hydrocarbon moiety, and $R^2$ and $R^3$ are hydrogen or optionally substituted hydrocarbon moieties.

10. An optical article according to claim 1 further characterized in that said molecular dipoles are further comprised of the following moieties:

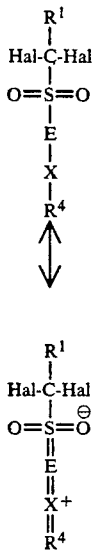

where

C is the α carbon atom of the sulfonyl atom,

E is a conjugated π bonding system, which provides a pathway for charge transfer resonance, Hal is in each occurrence an independently chosen halogen substituent of the α carbon atom, $R^1$ is hydrogen, halogen or an optionally substituted hydrocarbon moiety, $R^4$ is an optionally substituted hydrocarbon moiety, and X is oxygen or sulfur.

11. An optical article according to claim 1 further characterized in that said molecular dipoles are further comprised of the following moieties:

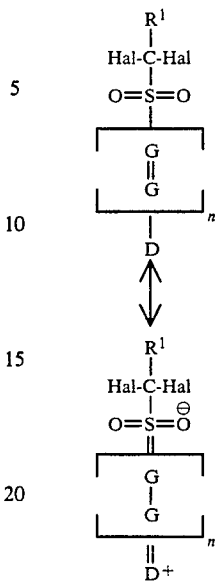

where

C is the α carbon atom of the sulfonyl atom,

D is an electron donor moiety,

Hal is in each occurrence an independently chosen halogen substituent of the α carbon atom, $R^1$ is hydrogen, halogen or an optionally substituted hydrocarbon moiety, G is independently in each occurrence methine or aza, and n is 4 to 20, preferably 8 to 14.

12. An optical article according to claim 11 further characterized in that n is 8 to 14.

13. An optical article according to claim 11 further characterized in that the linking moiety formed by G includes at least two planar aromatic rings.

14. An optical article according to claim 13 further characterized in that the linking moiety includes at least two coplanar carbocyclic aromatic rings.

15. An optical article according to claim 14 further characterized in that the linking moiety is a 4,4'-stilbenoid moiety.

16. An optical article according to claim 15 further characterized in that the linking moiety is a 4,4'-diazostilbene moiety.

17. An optical article according to claim 1 further characterized in that the sulfonyl moiety is a sulfonimino moiety.

18. An optical article according to claim 1 further characterized in the sulfonyl moiety is a trifluoromethyl sulfonyl moiety.

19. An optical article according to claim 1 further characterized in that the electron donor moiety is an amine.

20. An optical article according to claim 1 further characterized in that the molecular dipoles exhibit a second order polarizability of greater than $1 \times 10^{-28}$ electrostatic units.

* * * * *